UNITED STATES PATENT OFFICE.

DANDRIDGE H. BIBB, OF NEW YORK, N. Y., ASSIGNOR TO CONTINENTAL PROCESS CORPORATION, OF NEW YORK, N. Y., A CORPORATION OF NEW YORK.

WATERPROOFED WOOD AND PROCESS OF PRODUCING THE SAME.

1,165,355.     Specification of Letters Patent.     Patented Dec. 21, 1915.

No Drawing.     Application filed January 6, 1915. Serial No. 747.

*To all whom it may concern:*

Be it known that I, DANDRIDGE H. BIBB, a citizen of the United States, residing at New York, county and State of New York, have invented certain new and useful Improvements in Waterproofed Wood and Processes of Producing the Same, of which the following is a full, clear, and exact description.

My invention relates to a new and useful improvement in waterproofed wood and the process of producing the same, and has for its object to produce treated wood which is substantially impervious to moisture and resistant to the action of the elements, the same being particularly useful for railroad ties, telegraph poles, cross arms, paving blocks, fence posts, bridge timbers, foundation timbers and the like.

The following is a description of the wood embodying my invention and of my process of producing the same.

In the manufacture of cellulose or paper pulp by what is known as the "sulfite process", which consists in boiling wood and other fibers under pressure in a solution containing sulfurous acid and a base such as lime (CaO) or magnesia, a vast quantity of watery mixture known as "waste sulfite liquor" is produced. I have discovered that by evaporating this waste sulfite liquor to a density of about 25° to 33° Baumé, and then subjecting the same to a sustained heat from about 550° to 650° F. for a period of about twenty minutes, a product is produced which is insoluble in water. I have further discovered that if wood is more or less saturated with this waste sulfite liquor and then treated so as to convert the waste sulfite liquor into the insoluble product above referred to, that the wood becomes substantially waterproof.

In carrying out my invention in its preferred form, I take the waste sulfite liquor evaporated to a density of from 25° to 33° Baumé, immerse the wood therein, preferably while the liquor is boiling, for such a length of time as to allow the pores of the wood, for a considerable depth, to absorb a portion of the liquor, and then subject the wood thus impregnated to such a temperature and for such a period as will render the sulfite liquor within the pores of the wood insoluble. I have found that subjecting it for a period of twenty minutes to any temperature between 550° and 650° F. is sufficient. In some instances it is desirable that the impregnation of the wood be accomplished by placing the wood in a closed vessel or boiler containing the evaporated waste sulfite liquor and subjecting the same to a high pressure to force the liquor deeper into the wood, then subjecting the wood to heat in the manner substantially as above described. The moisture in the wood is first preferably removed either by drying the wood naturally or by artificial means before immersion.

The wood after impregnation is subjected to the heat in a suitable kiln, which should be cooled somewhat before it is opened so as not to expose the highly heated impregnated wood to the oxygen of the air.

The product produced by the process above described consists of wood having pores filled with an insoluble residue of waste sulfite liquor, the insolubility of the waste sulfite liquor being produced by the action of heat upon the liquor while within the pores of the wood. The wood so treated is substantially impervious to moisture and is thereby preserved and its life lengthened, increasing its commercial value for purposes where the desideratum is preservation and resistance to the action of the elements, such as for railroad ties, telegraph poles, cross-arms, paving blocks, fence posts, bridge timbers, foundation timbers and the like.

As will be evident to those skilled in the art, my invention permits of various modifications without departing from the spirit thereof or the scope of the appended claims.

What I claim is:

1. The improved process of treating wood which consists in impregnating it with waste sulfite liquor and subjecting it when thus impregnated to a temperature sufficient to render the waste sulfite liquor insoluble.

2. The improved process of treating wood which consists in impregnating it with waste sulfite liquor to a density of about from 25° to 33° Baumé and subjecting it when thus impregnated to a temperature sufficient to render the waste sulfite liquor insoluble.

3. The improved process of treating wood which consists in impregnating it with waste sulfite liquor to a density of about from 25° to 33° Baumé and subjecting it when thus impregnated to a temperature of about 550° to 650° F., so as to render the waste sulfite liquor insoluble.

4. The improved process of treating wood which consists in impregnating it with waste sulfite liquor to a density of about from 25° to 33° Baumé and subjecting it when thus impregnated to a temperature of about 550° to 650° F. for about twenty minutes, so as to render the waste sulfite liquor insoluble.

5. The improved product which consists in wood having its pores filled with an insoluble residue of waste sulfite liquor.

DANDRIDGE H. BIBB.

Witnesses:
H. B. BROWNELL,
HENDERSON F. HILL.